United States Patent

Lewis

[15] 3,668,511

[45] June 6, 1972

[54] SELF ENERGIZING TAP SWITCH FOR ELECTRONIC TAP CHANGER

[72] Inventor: Charles E. Lewis, Zanesville, Ohio

[73] Assignee: McGraw-Edison Company, Elgin, Ill.

[22] Filed: Feb. 16, 1971

[21] Appl. No.: 115,204

[52] U.S. Cl. ....................................... 323/43.5 S, 307/130

[51] Int. Cl. ....................................... G05f 1/14

[58] Field of Search ....................... 323/43.5 S; 307/112, 130

[56] References Cited

UNITED STATES PATENTS

| | | | |
|---|---|---|---|
| 3,551,789 | 12/1970 | Baker et al. | 323/43.5 S |
| 3,530,358 | 9/1970 | Thompson | 323/43.5 S X |
| 3,530,369 | 9/1970 | Thompson | 323/43.5 S X |

*Primary Examiner*—Robert K. Schaefer
*Assistant Examiner*—William J. Smith
*Attorney*—Richard C. Ruppin

[57] ABSTRACT

A self energizing tap switch is disclosed as being connected in circuit with the primary winding of a transformer having a plurality of tap sections connected to an electronic tap changer. The tap switch connects two portions of the primary winding together when the transformer is initially energized or after the winding has been energized when there is no shunt connection between connections or when a malfunction causes the opening of a tap connection between tap sections. The tap switch includes a pair of silicon controlled rectifiers for carrying transformer load current during alternate half cycles of the energy source connected to the terminals of the primary winding. The gating circuit for each of the silicon rectifiers includes a capacitor for creating a gate current which leads the load current in the situation where the load current leads the load voltage. When a tap section is shunted out of the primary winding by a tap connection, it is desired that the silicon controlled rectifiers do not conduct to short out the tap shunt connection and thereby effectively reinsert the tap section. To prevent such conduction, a second pair of silicon controlled rectifiers are each connected in parallel with the gate-cathode circuit of one of the first pair of silicon controlled rectifiers. The second pair of silicon rectifiers are gated when a tap shunt connection is made so that gate current to the first pair of silicon rectifiers is diverted and prevented from triggering the first pair of silicon controlled rectifiers.

14 Claims, 6 Drawing Figures

Inventor:
Charles E. Lewis
By: Richard C. Ruppin
Atty

Inventor:
Charles E. Lewis
By Richard C. Ruppin
Att'y.

SELF ENERGIZING TAP SWITCH FOR ELECTRONIC TAP CHANGER

BACKGROUND OF THE INVENTION

This invention relates to a self energizing tap switch for an electronic tap changer and particularly to a self energizing tap switch utilizing only static components.

Transformer tap changers of the electromechanical type are well known and present several different problems. Electromechanical switching devices produce an arc at the time of circuit breaking and therefore must be enclosed when they are installed in the tank of a transformer. Electromechanical tap changers are also subject to wear and consequent maintenance expense. Moreover, they have a relatively substantial response time and therefore cannot be used where substantially instantaneous switching is required. These problems can be solved by using an electronic tap changer. However, an electronic tap changer also has a number of problems including a simple and reliable means of initially energizing the electronic tap changer and thereafter maintaining the tap changer in operation in the event of temporary energy source failure or malfunction of the tap changer.

SUMMARY OF THE INVENTION

It is an object of the invention to provide in an electronic tap changer a simple and reliable tap switch which is self energizing when the primary winding of a transformer to which it is connected is initially energized to permit energizing of the entire tap changer from the output of the transformer secondary winding and to maintain the tap changer energized in the event of temporary energy source failure or tap changer malfunction and which will not conduct primary winding load current at any time a transformer tap section is effectively switched out of the primary winding.

The objects of the invention are accomplished by a switching circuit connected to the primary winding of a transformer and having a first pair of silicon controlled rectifiers connected in parallel between tap sections of the primary winding. The tap sections are also connected to a tap changer which removes tap sections from the primary winding by shunting the sections. Absent a shunt tap connection, the anode-cathode circuits of each of the silicon controlled rectifiers carry the load current of the primary winding during alternate cycles of an alternating current power source connected across the primary winding. The first pair of silicon controlled rectifiers are gated by a voltage in phase with the load voltage of the primary winding. However, in a leading power factor situation the load current of the primary winding may lead the load voltage so that if momentary open circuiting of the connected sections of the primary winding is to be prevented, the first pair of silicon controlled rectifiers must be gated ahead of the load voltage and simultaneously with the load current. This gating sequence is accomplished by providing capacitors in the gate circuits to each of the gate electrodes of the first pair of silicon controlled rectifiers so that the gate current will occur not later than the load current to the anodes of the silicon controlled rectifiers.

When a tap connection to the primary winding is made, a tap section of the winding is effectively shunted out of the winding circuit insofar as the secondary winding is concerned and in this condition it is desired that the first pair of silicon controlled rectifiers do not conduct since they would short circuit the tap connection. To prevent conduction of the first pair of silicon controlled rectifiers, a second pair of silicon controlled rectifiers are provided. Each anode-cathode circuit of the second pair of silicon controlled rectifiers is connected in shunt with gate-cathode circuit of one of the first pair of silicon controlled rectifiers and each gate-cathode circuit of the second pair of silicon controlled rectifiers is connected in parallel with the anode-cathode circuit of one of the first silicon controlled rectifiers. When a tap connection is made, the voltage across the anode-cathode circuit of each of the first pair of silicon controlled rectifiers provides gate current to the gate electrode of one of the second pair of silicon controlled rectifiers. Thus, one of the second pair of rectifiers will conduct to shunt the gate current of the corresponding one of the first pair of silicon controlled rectifiers to prevent the latter from conducting.

DESCRIPTION OF THE PREFERRED EMBODIMENT

Figure 1:
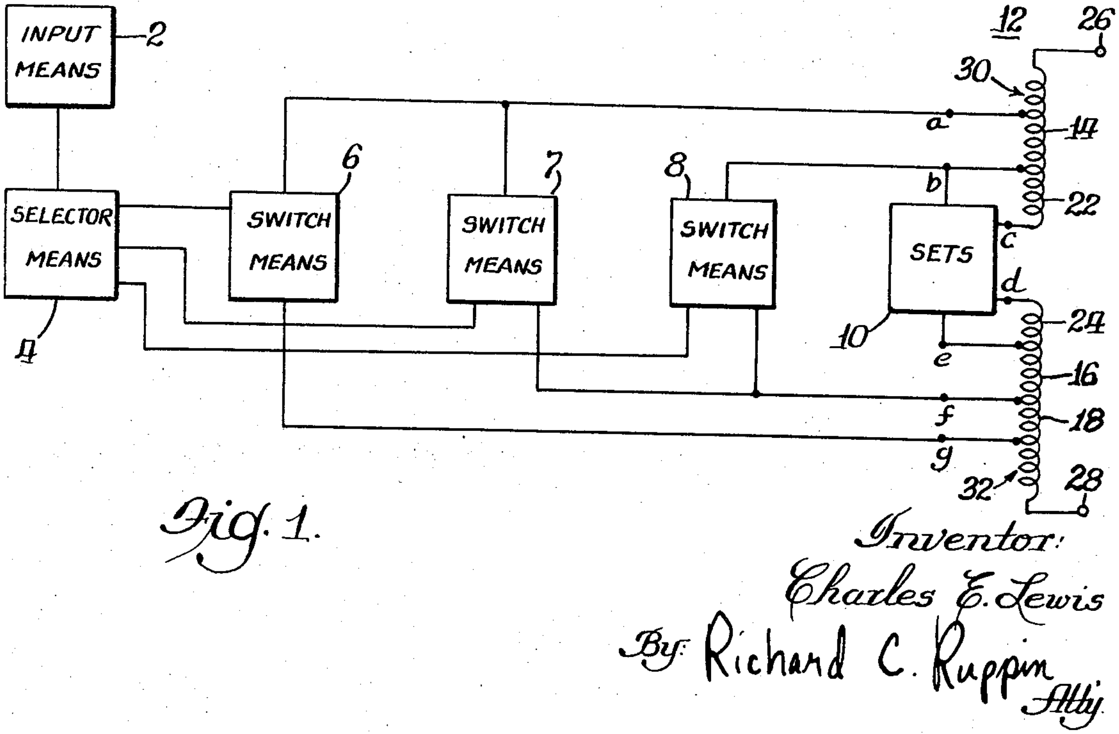
FIG. 1 is a block diagram of an electronic tap changer including a self-energizing tap switch according to instant invention.

Referring to the drawings and in particular to FIG. 1, an electronic tap changer is shown as having input means 2, selector means 4, switch means 6, 7 and 8 and a self-energizing tap switch 10. The tap changer is connected to the primary winding 12 of a transformer also having a secondary winding (not shown). The primary winding 12 has a plurality of tap sections 14, 16 and 18 and gate tap sections 22 and 24. Although FIG. 1 shows only three switch means 6, 7 and 8 for switching three tap sections 14, 16 and 18 into and out of circuit with the rest of primary winding 12, any desired number of switch means and corresponding tap sections may be used. An alternating polarity voltage is applied across the primary winding 12 by an A.C. energy source connected to terminals 26 and 28. The primary winding 12 includes the two portions 30 and 32 and, as previously stated, the self-energizing tap switch 10 functions to complete the circuit between the tap sections of the two portions 30 and 32 when the primary winding 12 is initially energized and to maintain this connection in the event of momentary power source interruption or malfunction of the rest of the electronic tap changing circuit.

The primary winding 12 induces a voltage in a secondary winding and this voltage may be higher or lower than a predetermined voltage range, depending on the load connected to the secondary winding. As described in detail in co-depending application Ser. No. 115,203, filed Feb. 16, 1971, and assigned to the same assignee as the instant application, if the voltage on the secondary winding is above or below the desired range, an input signal will be produced to an input means such as input means 2 in FIG. 1 and the input means 2, in turn, produces a signal to a selector means 4. Depending on whether the secondary voltage is above or below the desired range, the selector means 4 will select a switch means that will add a tap section into the circuit of primary winding 12 or select a switch means that will effectively remove a tap section 14, 16 or 18 from the circuit of primary winding 12. The adding or removal of one of the tap sections 14, 16 or 18 will, of course, result in the raising or lowering of the voltage on the secondary winging so that the input signal from the secondary winding will then cease.

Figure 2:
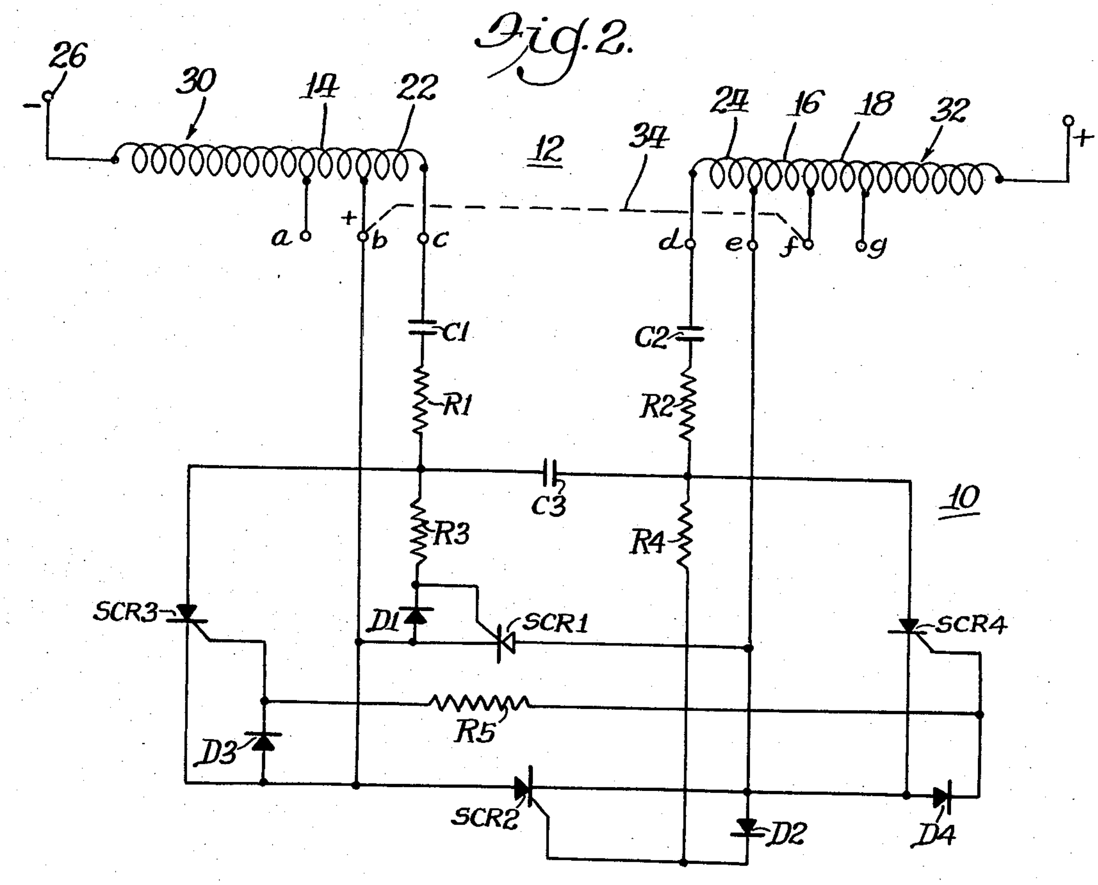
FIG. 2 shows a circuit diagram of the self-energizing tap switch.

Referring now to FIG. 2, the self-energizing tap switch is shown connected to tap terminals b and c of gate tap section 22 and *d* and *e* of gate tap section 24. For simplicity, the switch means 6, 7 and 8 are not shown connected in FIG. 2. However, the switch means 6, 7 and 8 may be considered to be connected in FIG. 2 to tap terminals *a*, *b*, *f* and *g* as shown in FIG. 1.

The tap switch 10 includes SCR 1 and SCR 2 for carrying load current $I_L$ in opposite directions through the primary winding 12 during alternation of the power source connected to terminals 26 and 28. The gate electrodes of SCR 1 is connected to terminal *c* of gate tap section 22 through resistors R3 and R1 and capacitor C1. Similarly the gate electrode of SCR 2 is connected to terminal *d* of gate section 24 through resistors R4 and R2 and capacitor C2. The resistors R1 and R3 and capacitor C1 provide a gate current $I_G$ that leads the load current $I_L$ through the anode-cathode circuit of SCR1. The resistors R4 and R2 and capacitor C2 perform an identical function for the gate of SCR2. The diodes D1 and D2 are respectively connected across the gate-cathode circuits of SCR 1 and SCR 2 to protect the gates of each of these SCRs from high inverse voltages and also allow capacitors C1 and C2 to draw charging current when the cathodes of SCR 1 and SCR 2 are positive relative to the polarity of the gates of SCR 1 and SCR 2. SCR 3 and SCR 4 are respectively connected in parallel with the gate-cathode circuits of SCR 1 and SCR 2 for the purpose of shunting gate current $I_G$ around the gates of SCR 1 and SCR 2 and thereby prevent them from conducting when a tap connection is made, as will be discussed hereinafter in greater detail. Diode D4 and resistor R5 provide an energizing circuit to the gate electrode SCR 3 from terminal *e* of gate tap section 24. Diode D3 and resistor R5 similarly provide an energizing circuit to the gate electrode of SCR 4 from terminal *b* of gate section 22. Capacitor C3 is connected to the gates of SCR 1 and SCR 2 and provides a gate signal for firing SCR 1 and SCR 2 when the primary winding 12 of the transformer is initially energized.

As previously stated, the electronic tap changer is energized from the secondary winding of the transformer. Thus, when the primary winding 12 is initially energized, there will be no voltage induced in the secondary winding for energization of the tap changer until the portions 30 and 32 of the primary winding 12 are connected together. In the de-energized condition of the tap changer, the switch means 6, 7 and 8 are all in a non-conducting condition so that they will not initially serve to connect the transformer portions 30 and 32 together. However, when the primary winding 12 is energized, the capacitor C3 will charge to a voltage sufficient to provide a gating signal to either SCR 1 or SCR 2. SCR 1 and SCR 2 will then conduct during alternate half cycles of the alternating current power source connected across the primary winding 12. Voltage is thereby induced in the secondary winding so that the entire tap changer is energized after initial energization of the primary winding 12. Thus, before any one of the switch means 6, 7 or 8 conduct, all of the tap sections 14, 16 and 18 will be effectively connected in series and the load current $I_L$ in primary winding 12 will be through tap sections 14, 16 and 18 and through the anode-cathode circuits of either SCR 1 or SCR 2 as the potential across winding 12 alternates. It is well known in the art that when the maximum number of serially connected tap sections of a primary winding are effectively connected, the induced output voltage of the secondary winding will be at its lowest value. Thus, if the secondary winding voltage is below the predetermined voltage range, the input means 2 and the selection means 4 will operate to actuate one of the switch means 6, 7 or 8 to a conducting condition so that one of the tap sections 14, 16 or 18 is shunted out of the primary winding 12. In the condition in which any one of the tap sections 14, 16 or 18 is shunted out of the primary winding 12, it is required that SCR 1 and SCR 2 of the self-energizing tap switch 10 do not conduct since conduction of either one of these SCRs would short circuit the load current through a switch means 6, 7 or 8. In FIG. 2, the tap section 16 is shown shunted out of series connection with the rest of the primary winding 12 by the tap lead 34 shown as a dashed line. The lead 34 represents the switch means 8 in its conductive condition and is utilized only as a means of simplification.

The tap lead 34 applies a reverse bias voltage across the anode-cathode circuits of SCR 1 and SCR 2 to prevent SCR 1 and SCR 2 from conducting when the tap lead 34 is present. Considering SCR 1, for example, during the period of the alternating current in which terminal 28 of primary winding 12 is positive relative to the polarity of terminal 26, terminal f of primary winding 12 will be more positive than terminal *e*. The connection of terminal *f* to terminal *b* thus places a voltage on the cathode of SCR 1 which is more positive than the voltage on its anode from terminal *e*. The reverse biasing of the anode-cathode circuit of SCR 2 is similar when the polarities on terminals 26 and 28 reverse so that terminal 26 is positive relative to terminal 28.

Figure 3:
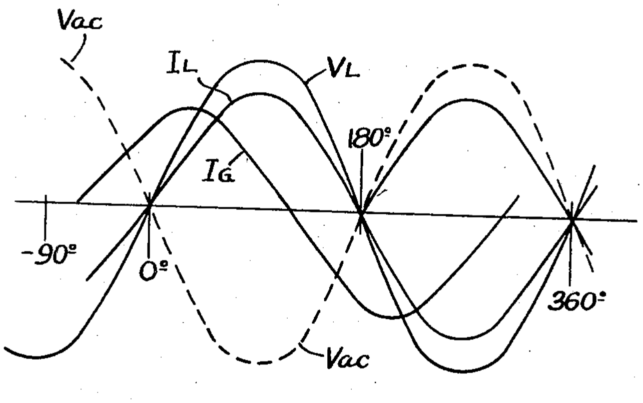
FIGS. 3–6 illustrate voltage and current wave forms for different conditions of operation and different power factor conditions of the electronic tap changer and transformer to which it is connected.
Figure 4:
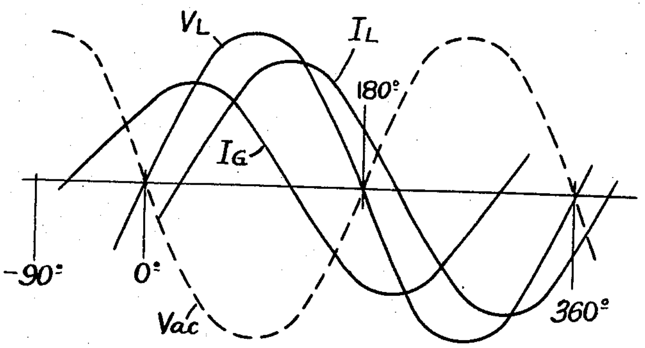

The operation of the tap switch 10 in conjunction with the primary winding 12 may be considered in greater detail with reference to FIGS. 3–6. The voltage-current conditions of primary winding 12 include the unity power factor condition in which load current $I_L$ is in phase with load voltage $V_L$, the lagging power factor condition in which load current $I_L$ lags load voltage $V_L$ and the leading power factor condition in which load current $I_L$ leads load voltage $V_L$. The unity power factor condition is shown in FIG. 3. In FIG. 3, $V_L$ and $I_L$ respectively represent the voltage and current across and through the tap lead 34 between terminals *b* and *e* or the voltage and current across and through SCR 1 and SCR 2 depending on whether the tap lead 34 is present. $I_G$ is the conducting signal or gating current to the gate electrodes of SCR 1 and SCR 2 and $V_{ac}$ is the reverse voltage across the anode-cathode circuit of SCR 1 and SCR 2. As shown in FIGS. 3–6, $V_{ac}$ is merely the reverse voltage of $V_L$ and is created by the tap lead connection 34 shown in FIG. 2. It may be considered in FIGS. 3–6 that the wave form portions between 0° and 180° are the voltage and current conditions relating to SCR 1 when terminal 28 of primary winding 12 is positive relative to terminal 26 and the wave forms between 180° and 360° are the wave form portions relating to SCR 2 when terminal 26 is positive relative to terminal 28. Since the operation of tap switch 10 with respect to SCR 1 is identical to its operation with respect to SCR 2, only the wave forms relating to SCR 1 will be discussed. Considering FIGS. 3–5 in the condition in which the tap lead 34 is not connected so that $V_{ac}$ does not exist, the load voltage $V_L$ across SCR 1 is as shown. Gate current $I_G$ to the gate of SCR 1 leads load current $I_L$ due to the effect of C1, R1 and R3. The need for $I_G$ to lead load current $I_L$ is not critical in the unity and lagging power factor cases of FIGS. 3 and 4 since $I_G$ flows as a result of voltage drop across gate section 22 and this voltage is in phase with load voltage $V_L$ so that $I_G$ will provide a positive signal to the gate of SCR 1 either simultaneously with or just before the occurrence of $I_L$ in the forward conducting direction of SCR 1. However, with C1 in the circuit as shown in FIG. 2, the gating current $I_G$ will be available at the gate of SCR 1 prior to and at the time load current $I_L$ becomes positive so that SCR 1 will conduct as soon as the proper value of $I_L$ is available. This is critical in the leading power factor case shown in FIG. 5 since without C1, $I_G$ would be in phase with load voltage $V_L$ so that when load current $I_L$ becomes positive relative to the forward conducting direction of SCR 1, the primary winding 12 would be open circuited because SCR 1 would not conduct until the positive gating signal became available.

Figure 5:
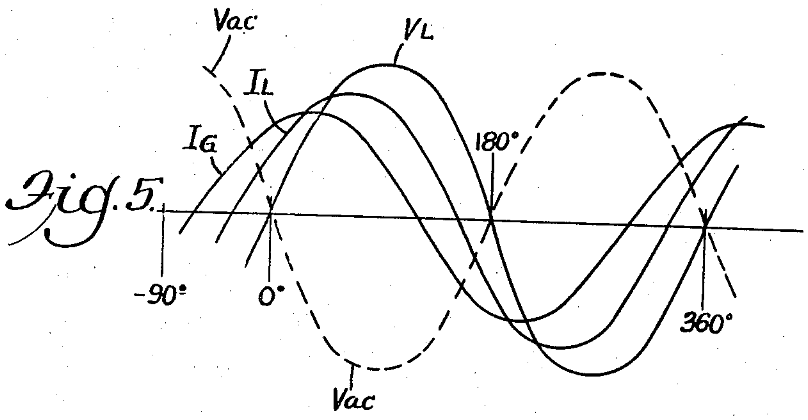
Figure 6:
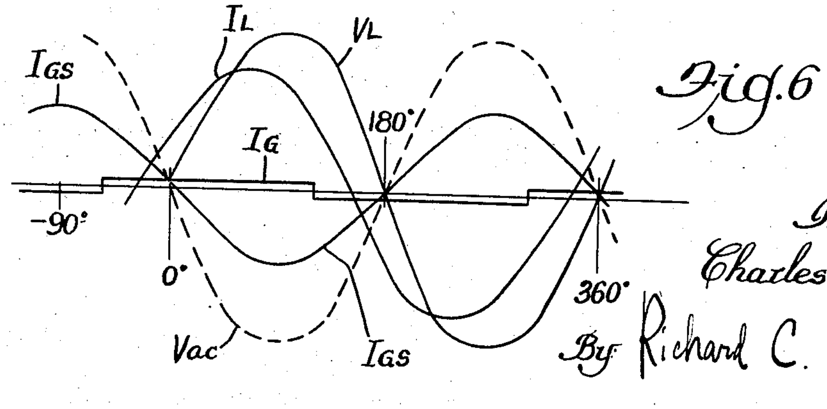

When the tap lead 34 is connected, the reverse voltage $V_{ac}$ across the anode-cathode circuit of SCR 1 is the dashed wave form as shown in FIGS. 3–6. In the area between 0° and what has been designated as −90° in FIGS. 3 and 4, $V_{ac}$ will be in a forward biasing direction across the anode-cathode circuit of SCR 1 at the same time that the positive gate signal current $I_G$ is applied to the gate of SCR 1. However, since the load current $I_L$ in FIGS. 3 and 4 does not become positive until simultaneously with or after the load voltage $V_L$ becomes positive, the tap lead 34 will carry the load current $I_L$ and no load current $I_L$ will be available for SCR 1 to conduct. This is not the situation in the leading power factor case shown in FIG. 5. In FIG. 5, gate current $I_G$ and load current $I_L$ both become positive at the time reverse bias voltage $V_{ac}$ is positive across SCR 1 and before load voltage $V_L$ becomes positive. To prevent SCR 1 from conducting in this situation and shorting the tap lead 34 and thereby reinserting tap section 16 into the primary winding 12, SCR 3 is provided to shunt the gate current $I_G$ around the gate of SCR 1. SCR 4 is provided to perform a similar function for SCR 2. As may be seen in FIG. 2, the anode-cathode circuit of SCR 3 is connected in parallel with R3 and the gate-cathode circuit of SCR 1. Thus, the anode-cathode circuit of SCR 3 will divert $I_G$ from the gate of SCR 1 when SCR 3 conducts. The gate current circuit for SCR 3 is from terminal $e$ of the primary winding 12 through diode D4, resistor R5, the gate and cathode electrodes of SCR 3, to terminal $b$ of winding 12. It may be readily seen that the gate-cathode circuit of SCR 3 is in parallel with the anode-cathode circuit of SCR 1, so that gate current $I_{GS}$ to the gate of SCR 3 is in phase with reverse voltage $V_{ac}$. This relationship is shown in FIG. 6. Moreover, in the period between −90° and 0°, FIGS. 5 and 6 show that $I_{GS}$ is positive at the gate of SCR 3 at the time that gate current $I_G$ is positive at the gate of SCR 1 and load current $I_L$ becomes positive relative to the forward conduction direction of SCR 1. However, since $I_{GS}$ provides a gating signal to SCR 3 when gate current $I_G$ is available to SCR 1, $I_G$ is shunted through SCR 3 around the gate of SCR 1 and SCR 1 thus does not receive the gate signal and will not conduct. In FIG. 6, the gate current $I_G$ is zero for both SCR 1 and SCR 2 due to the shunting effect of SCR 3 and SCR 4, however, for purposes of illustration to show the alternate conducting periods of SCR 3 and SCR 4, $I_G$ is shown slightly spaced from the abscissa.

The tap switch will operate as described in the foregoing with any one or all of the tap sections 14, 16 and 18 shunted out of the primary winding 12 by a switch means 6, 7 or 8. Thus SCR 1 and SCR 2 will not conduct and carry load current $I_L$ at any time there is a tap section shunted out of the primary winding 12. On the other hand, the tap switch 10 will connect the primary winding portions 30 and 32 together when the transformer is initially energized and will maintain this connection if no tap section is shunted out of the primary winding 12 or if there is a momentary line interruption of a malfunction of the electronic tap changer.

While only a single specific embodiment of the invention has been shown herein, it will be realized that many modifications thereof are feasible without departing from the spirit and scope of the invention. It is accordingly intended that the scope of the invention is not to be limited to the specific embodiment disclosed.

I claim:

1. In an electronic tap changer for a transformer including a secondary winding and a primary winding having a plurality of tap sections and being connected to an alternating polarity current and voltage energy source and carrying said current, a tap switch comprising:
- circuit means coupled to the primary winding for producing a conducting signal comprising energy from said source and having a predetermined relationship with said current; and
- first switch means connected in an electrical circuit between two of said tap sections and receiving said signal, said first switch means being responsive to said signal and to said current to conduct the current between said two tap sections of the primary winding.

2. The combination according to claim 1 wherein said circuit means is responsive to the voltage on one of said tap sections to produce said conducting signal.

3. The combination according to claim 2 wherein:
- said circuit means is producing said conducting signal at the time said current changes polarity; and
- said first switch means has an opposite current conducting direction for each alternate polarity of said current and is responsive to said conducting signal when the current changes polarity to conduct current in each of said opposite directions.

4. The combination according to claim 3 wherein:
- said conducting signal has two separate portions; and
- said first switch means includes first and second static switches alternately conducting said current in a different one of said opposite directions, each static switch being responsive to a different one of the two portions of the conducting signal to conduct said current.

5. The combination accordint to claim 4 wherein:
- said first and second static switches each have an input circuit separately connected to said circuit means and respectively receiving a different one of the two portions of the conducting signal; and further comprising
- shunting means connected in parallel with said input circuits for diverting said conducting signal from said input circuits whereby conduction of said first and second static switches is prevented.

6. The combination according to claim 1 wherein:
- said primary winding has a load current conductive condition and a load current non-conductive condition; and
- said circuit means produces said conducting signal while said primary winding is in said load current non-conductive condition.

7. The combination according to claim 1 wherein said circuit means is directly connected to the primary winding and stores electrical energy from said source, said conducting signal comprising electrical energy stored by said circuit means.

8. In an electronic tap changer including a tap changing switch for a transformer having a secondary winding and a primary winding having a plurality of tap sections and being connected to an alternating polarity current and voltage energy source and carrying current from said source, a tap switch comprising:
- circuit means coupled to the primary winding for producing a conducting signal;
- first switch means responsive to the conducting signal and to said current to conduct the current between said tap sections of the primary winding; and
- second switch means in a current conducting circuit with said primary winding and said first switch means for selectively preventing conduction of the first switch means.

9. The combination according to claim 8 wherein said second switch means is responsive to a predetermined voltage drop on said primary winding to prevent conduction of the first switch means.

10. The combination according to claim 8 wherein:
- said tap changing switch has a conductive condition in shunt with said first switch means;
- said first switch means has a first instantaneous voltage drop thereacross when conducting said current and a second instantaneous voltage drop opposite to the first voltage drop when said tap changing switch is in a conductive condition; and
- said second switch means is responsive to the second voltage drop to prevent conduction of the first switch means.

11. The combination according to claim 10 wherein said second switch means is conductive in response to said second voltage drop to divert said conducting signal from the first switch means.

12. The combination according to claim 11 wherein:
- said first switch means has an input circuit receiving said conducting signal; and
- said second switch means is connected to said input circuit.

13. The combination according to claim 12 wherein:
- said first switch means comprises a first pair of static switches each conductive in an opposite direction as the polarity of said current alternates and each having a first control electrode receiving a different portion of said conducting signal; and
- said second switch means comprises a second pair of static switches each having first and second series connected electrodes in shunt circuit with one of said first control electrodes and each having a second control electrode receiving said second voltage drop, each of said first and second electrodes of a second static switch becoming conductive when the second control electrode of the same second static switch receives a predetermined portion of the second voltage drop.

14. The combination according to claim 13 wherein said second voltage drop is an alternating polarity voltage drop and said predetermined portion is a portion of the second voltage drop having the same polarity as said current.

* * * * *